(12) United States Patent
Hallivuori et al.

(10) Patent No.: US 10,554,339 B2
(45) Date of Patent: Feb. 4, 2020

(54) METHODS AND DEVICES FOR MANAGING TRANSFER OF DATA FRAMES

(71) Applicant: CORIANT OY, Espoo (FI)

(72) Inventors: Ville Hallivuori, Espoo (FI); Juhamatti Kuusisaari, Helsinki (FI)

( * ) Notice: Subject to any disclaimer, the term of this patent is extended or adjusted under 35 U.S.C. 154(b) by 69 days.

(21) Appl. No.: 15/556,574

(22) PCT Filed: Mar. 10, 2015

(86) PCT No.: PCT/FI2015/050153
§ 371 (c)(1),
(2) Date: Sep. 7, 2017

(87) PCT Pub. No.: WO2016/142572
PCT Pub. Date: Sep. 15, 2016

(65) Prior Publication Data
US 2018/0054279 A1 Feb. 22, 2018

(51) Int. Cl.
*H04L 1/00* (2006.01)
*H04L 1/16* (2006.01)
*H04L 1/18* (2006.01)

(52) U.S. Cl.
CPC .......... *H04L 1/0083* (2013.01); *H04L 1/0008* (2013.01); *H04L 1/1635* (2013.01); *H04L 1/1685* (2013.01); *H04L 1/1809* (2013.01)

(58) Field of Classification Search
None
See application file for complete search history.

(56) References Cited

U.S. PATENT DOCUMENTS

| | | | |
|---|---|---|---|
| 2003/0179752 A1* | 9/2003 | Grass | H04L 12/6418 370/394 |
| 2005/0129058 A1* | 6/2005 | Casaccia | H04L 1/1671 370/464 |
| 2005/0190741 A1* | 9/2005 | Pettersson | H04W 72/0446 370/350 |
| 2005/0281243 A1* | 12/2005 | Horn | H04L 1/1803 370/345 |
| 2006/0045130 A1* | 3/2006 | Kim | H04L 1/16 370/469 |

(Continued)

OTHER PUBLICATIONS

International Search Report, dated Nov. 20, 2015, from corresponding PCT application No. PCT/FI2015/050153.

*Primary Examiner* — Daniel F. McMahon
(74) *Attorney, Agent, or Firm* — Young & Thompson

(57) ABSTRACT

A technique for managing transfer of data frames having a pre-determined mutual order is presented. Each data frame contains an order indicator, for example a sequence number, indicative of the position of the data frame in the pre-determined mutual order. A transmitting end provides each data frame with a satisfaction indicator that indicates whether acknowledgement about reception of earlier transmitted data frames is expected from a receiving end. When the satisfaction indicator of a data frame indicates that no acknowledgement is expected, the receiving end knows that the data frame can be treated as a beginning of a received data flow when checking the integrity of the received data flow on the basis of the order indicators. Thus, there is no need to establish a logical connection between the transmitting and receiving ends prior to the transfer of the data frames.

20 Claims, 3 Drawing Sheets

(56) References Cited

U.S. PATENT DOCUMENTS

| | | | |
|---|---|---|---|
| 2006/0067238 A1* | 3/2006 | Olsson | H04L 1/0083 370/242 |
| 2013/0070524 A1* | 3/2013 | Dutta | G11C 11/5642 365/185.03 |
| 2013/0170272 A1* | 7/2013 | Anholt | G11C 11/5642 365/45 |

* cited by examiner

METHODS AND DEVICES FOR MANAGING TRANSFER OF DATA FRAMES

FIELD OF THE DISCLOSURE

The disclosure relates generally to managing transfer of data frames that have a pre-determined mutual order. More particularly, the disclosure relates to a method, to a device, and to a computer program for managing transmission of data frames having a pre-determined mutual order. Furthermore, the disclosure relates to a method, to a device, and to a computer program for managing reception of data frames having a pre-determined mutual order. Furthermore, the disclosure relates to a network element that can be for example but not necessarily a router.

BACKGROUND

In conjunction with packet- or cell-switched data transfer there is often a need to manage a data flow constituted by data frames which have a pre-determined mutual order. Typically, the data transfer has to be managed so that a receiving end is capable of reconstructing the pre-determined mutual order of the data frames also in cases where a mutual order of two or more of the data frames is changed during the transfer and/or one or more of the data frames are lost and thus have to be retransmitted. The data frames can be for example Internet Protocol "IP" packets, Ethernet frames, or some other independently forwarded data entities. The data frames are typically provided with order indicators arranged to indicate the pre-determined mutual order of the data frames. The order indicators can be for example sequence numbers. In a case where the temporal reception order of the data frames at the receiving end is not the same as the pre-determined mutual order, the receiving end reorders the data frames on the basis of the order indicators.

A traditional way to apply the above-described principle based on the order indicators is such that the transmitting end and the receiving end carry out a hand-shaking process for establishing a logical connection state between the transmitting and receiving ends. The logical connection state is used for handling for example situations where one or more of the data frames are lost and thus have to be retransmitted. After the logical connection state has become needless, the logical connection state can be tore down. Inconveniences related to this approach are the need for the hand-shaking process prior to the transfer of the data frames and a need for mutually synchronized state-machine structures at the transmitting and receiving ends for maintaining the logical connection state.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new device for managing transmission of data frames that have a pre-determined mutual order. The device can be for example a part of a network element of a data transfer network. The device comprises a control system configured to:

provide, each of the data frames, with an order indicator indicative of the position of the data frame under consideration in the pre-determined mutual order of the data frames, provide, each of the data frames, with a satisfaction indicator indicating whether acknowledgement information about reception of one or more of those of the data frames transmitted earlier than the data frame under consideration is expected from an entity for receiving the data frames, and set, in response to a need to retransmit a data flow starting from one of the data frames, the satisfaction indicator of the one of the data frames to indicate that no acknowledgement information about reception of any data frame transmitted earlier than the one of the data frames is expected from the entity for receiving the data frames.

In accordance with the invention, there is provided also a new device for managing reception of data frames that have a pre-determined mutual order. The device can be for example a part of a network element of a data transfer network. The device comprises a control system configured to:

read, from each of the data frames that have been received, an order indicator indicative of the position of the received data frame in the pre-determined mutual order of the data frames, read, from each of the received data frames, a satisfaction indicator which indicates whether an entity for transmitting the data frames expects acknowledgement information about reception of one or more of those of the data frames transmitted earlier than the received data frame under consideration, and treat, in response to a situation in which the satisfaction indicator of one of the received data frames indicates that no acknowledgement information is expected, the one of the received data frames as a beginning of a received data flow when checking the integrity of the received data flow on the basis of the order indicators, and otherwise treat the one of the received data frames as a later portion of the received data flow when checking the integrity of the received data flow on the basis of the order indicators.

There is no need to establish a logical connection between the transmitting and receiving ends prior to the transfer of the data frames because, when the satisfaction indicator of a data frame indicates that no acknowledgement about earlier transmitted data frames is expected, the receiving end knows that the data frame under consideration can be treated as a beginning of a received data flow e.g. when checking the integrity of the received data flow on the basis of the order indicators. In many applications, a satisfaction indicator which indicates that the transmitting entity does not expect acknowledgement information about reception of any earlier transmitted data frames is advantageously interpreted to mean that the transmitting entity expects acknowledgement information neither about reception of possible earlier transmitted instances of the data frame carrying the satisfaction indicator under consideration nor about reception of any other earlier transmitted data frames, i.e. possible earlier transmitted instances of the data frame carrying the satisfaction indicator under consideration are deemed to belong to the group of earlier transmitted data frames.

In accordance with the invention, there is provided also a new network element for a data transfer network. The network element can be, for example, an Internet Protocol "IP" router, a multiprotocol label switching "MPLS" switch, a packet optical switch, an Ethernet switch, an asynchronous transfer mode "ATM" switch, an OpenFlow switch, a software-defined networking "SDN" controlled network element, and/or a virtualized network function running in a virtual machine. A network element according to the invention comprises:
- a data transfer interface for connecting the network element to the data transfer network, and
- a processing system for controlling the operation of the network element.

The processing system is configured to constitute a device according to the invention for managing transmission of data frames and/or a device according to the invention for managing reception of data frames.

In accordance with the invention, there is provided also a new method for managing transmission of data frames that have a pre-determined mutual order. The method comprises:
- providing, each of the data frames, with an order indicator indicative of the position of the data frame under consideration in the pre-determined mutual order of the data frames,
- providing, each of the data frames, with a satisfaction indicator indicating whether acknowledgement information about reception of one or more of those of the data frames transmitted earlier than the data frame under consideration is expected from an entity for receiving the data frames, and
- setting, in response to a need to retransmit a data flow starting from one of the data frames, the satisfaction indicator of the one of the data frames to indicate that no acknowledgement information about reception of any data frame transmitted earlier than the one of the data frames is expected from the entity for receiving the data frames.

In accordance with the invention, there is provided also a new method for managing reception of data frames that have a pre-determined mutual order. The second method comprises:
- reading, from each of the data frames that have been received, an order indicator indicative of the position of the received data frame in the pre-determined mutual order of the data frames,
- reading, from each of the received data frames, a satisfaction indicator which indicates whether an entity for transmitting the data frames expects acknowledgement information about reception of one or more of those of the data frames transmitted earlier than the received data frame under consideration, and
- treating, in response to a situation in which the satisfaction indicator of one of the received data frames indicates that no acknowledgement information is expected, the one of the received data frames as a beginning of a received data flow when checking the integrity of the received data flow on the basis of the order indicators, and otherwise treating the one of the received data frames as a later portion of the received data flow when checking the integrity of the received data flow on the basis of the order indicators.

In accordance with the invention, there is provided also a new computer program for computer program for managing transmission of data frames that have a pre-determined mutual order. The computer program comprises computer executable instructions for controlling a programmable processing system to:
- provide, each of the data frames, with an order indicator indicative of the position of the data frame under consideration in the pre-determined mutual order of the data frames,
- provide, each of the data frames, with a satisfaction indicator indicating whether acknowledgement information about reception of one or more of those of the data frames transmitted earlier than the data frame under consideration is expected from an entity for receiving the data frames, and
- set, in response to a need to retransmit a data flow starting from one of the data frames, the satisfaction indicator of the one of the data frames to indicate that no acknowledgement information about reception of any data frame transmitted earlier than the one of the data frames is expected from the entity for receiving the data frames.

In accordance with the invention, there is provided also a new computer program for managing reception of data frames that have a pre-determined mutual order. The second computer program comprises computer executable instructions for controlling a programmable processing system to:
- read, from each of the data frames that have been received, an order indicator indicative of the position of the received data frame in the pre-determined mutual order of the data frames,
- read, from each of the received data frames, a satisfaction indicator which indicates whether an entity for transmitting the data frames expects acknowledgement information about reception of one or more of those of the data frames transmitted earlier than the received data frame under consideration, and
- treat, in response to a situation in which the satisfaction indicator of one of the received data frames indicates that no acknowledgement information is expected, the one of the received data frames as a beginning of a received data flow when checking the integrity of the received data flow on the basis of the order indicators, and otherwise treat the one of the received data frames as a later portion of the received data flow when checking the integrity of the received data flow on the basis of the order indicators.

In accordance with the invention, there is provided also a new computer program product. The computer program product comprises a non-volatile computer readable medium, e.g. a compact disc "CD", encoded with a computer program according to the invention for managing transmission of data frames and/or with a computer program according to the invention for managing reception of data frames.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in the accompanied dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below with reference to the accompanying drawings, in which.

DESCRIPTION OF EXEMPLIFYING AND NON-LIMITING EMBODIMENTS

The specific examples provided in the description below should not be construed as limiting the scope and/or the applicability of the accompanied claims. Lists and groups of examples provided in the description below are not exhaustive unless otherwise explicitly stated.

Figure 1:
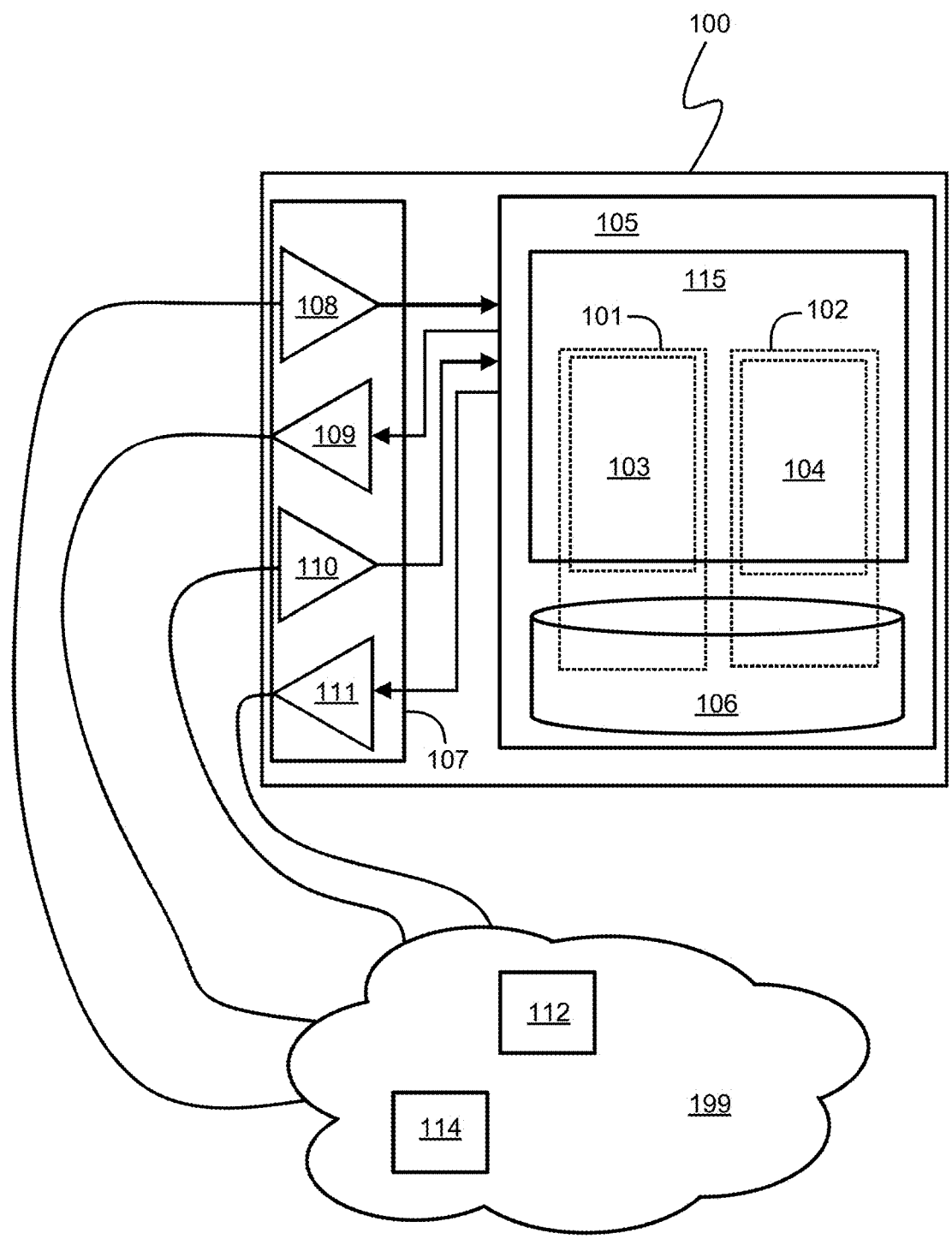
FIG. 1 shows a schematic illustration of a network element according to an exemplifying and non-limiting embodiment of the invention.

FIG. 1 shows a schematic illustration of a network element 100 according to an exemplifying and non-limiting embodiment of the invention. The network element can be, for example, an Internet Protocol "IP" router, a Multiprotocol label switching "MPLS" switch, a packet optical switch, an Ethernet switch, an asynchronous transfer mode "ATM" switch, an OpenFlow switch, a software-defined networking "SDN" controlled network element, and/or a virtualized network function running in a virtual machine. The network element 100 comprises a data transfer interface 107 for receiving digital data and for transmitting digital data. In this exemplifying case, the data transfer interface 107 comprises ingress ports 108 and 110 and egress ports 109 and 111 for connecting via data transfer links to other elements of a data transfer network. In FIG. 1, the elements of the data transfer network other than the network element 100 are depicted with a cloud 199 that comprises, among others, network elements 112 and 114.

The network element 100 comprises a processing system 105 for controlling data-forwarding and other functionalities of the network element. The processing system comprises a processing section 115 for and a memory section 106. The processing system is configured to constitute a first device 101 for managing transmission of data frames that have a pre-determined mutual order. Without limiting the generality and only for illustrative purposes, we assume that the network element 112 comprises an entity for receiving the data frames. The data frames can be for example Internet Protocol "IP" packets, Ethernet frames, or some other independently forwarded data entities.

The device 101 comprises a control system 103 that is implemented with the processing section 115 of the processing system 105. The control system 103 is configured to provide the data frames to be transmitted with order indicators so that the order indicator of each data frame indicates the position of the data frame under consideration in the above-mentioned mutual order of the data frames. The order indicators can be for example sequence numbers which express the positions of the data frames in the pre-determined mutual order. In practical implementations, each order indicator is presented with a finite amount of bits and thus the wrap-around of the order indicator may take place during the transfer of the data frames. The wrap-around can be handled e.g. by using a sufficient amount of bits in each order indicator and defining that zero is deemed to follow the maximum possible value.

The control system 103 is configured to provide each of the data frames with a satisfaction indicator that indicates whether acknowledgement information about reception of one or more of those of the data frames transmitted earlier than the data frame under consideration is expected from the network element 112. Thus, the network element 112 is allowed to know whether the data frame under consideration can be treated as a beginning of a received data flow, e.g. when checking the integrity of the received data flow on the basis of the order indicators, or whether there is a need to take care of data frames that have been transmitted earlier. When there is a need to retransmit a data flow starting from one of the data frames, the control system 103 sets the satisfaction indicator of this data frame to indicate that no acknowledgement information about reception of any earlier transmitted data frames is expected from the network element 112. The above-mentioned one of the data frames is the first data frame in the above-mentioned mutual order of the data frames if the retransmission has to be started from the beginning of the whole data flow constituted by all of the data frames. It is also possible that a first part of the whole data flow has been transferred and acknowledged correctly. In this case, the above-mentioned one of the data frames is the first data frame that is after the successfully transferred first part. The network element 112 can treat the above-mentioned one of the data frames as the beginning of the retransmitted data flow.

In the exemplifying network element 100 illustrated in FIG. 1, the processing system 105 is configured to constitute a second device 102 for managing reception of data frames having a pre-determined mutual order. Without limiting the generality and only for illustrative purposes, we assume that the network element 114 comprises an entity for transmitting the above-mentioned data frames. In principle, it is also possible that a network element according to an exemplifying and non-limiting embodiment of the invention comprises only one of the first and second devices 101 and 102.

The device 102 comprises a control system 104 that is implemented with the processing section 115 of the processing system 105. The control system 104 is configured to read an order indicator, e.g. a sequence number, from each of the data frames that have been received. The order indicator of each received data frame indicates the position of the received data frame in the above-mentioned mutual order of the data frames. The control system 104 is configured to read, from each of the received data frames, a satisfaction indicator which indicates whether the network element 114 expects acknowledgement information about reception of any data frame that has been transmitted earlier than the received data frame under consideration. In cases where the satisfaction indicator of a received data frame indicates that no acknowledgement information is expected, the control system 104 considers the received data frame to be the beginning of a received data flow when the control system 104 checks the integrity of the received data flow on the basis of the order indicators. Otherwise, the control system 104 treats the received data frame as a later portion of the received data flow when checking the integrity of the received data flow.

The control system 103 is advantageously configured to provide each of the data frames to be transmitted with a sender indicator that identifies the entity transmitting the data frames. The sender indicator enables the network element 112 to recognize the entity transmitting the data frames. The sender indicator may comprise for example an Internet Protocol "IP" address, a port number, and/or a Transparent Inter-process Communication "TIPC" port name.

The control system 104 is advantageously configured to read, from each of the received data frames, a sender indicator that identifies the entity that has transmitted the received data frames. With the aid of the sender indicator read from the received data frames, the control system 104 is capable of managing the reception of the data frames separately from other data frames having a different sender indicator. Thus, the control system 104 can manage the reception of the above-mentioned data flow transmitted by the network element 114 separately from, for example, another data flow transmitted by the network element 112.

The above-described functionalities for managing the transfer of data frames having a pre-determined mutual order can be supplemented with a retransmission functionality which is controlled by the above-mentioned acknowledgement information. The acknowledgement information may comprise positive acknowledgements "ACK" each identifying a data frame up to and including which a data flow has been successfully received, negative acknowledgements "NACK" each identifying one or more data frames that are, on the basis of the order indicators of received data frames, missing from a received data flow, and/or selective acknowledgements "SACK" each identifying both successfully received data frames and missing data frames so as to allow retransmission of only the missing data frames.

In a network element according to an exemplifying and non-limiting embodiment of the invention, the control system 103 is configured to initiate retransmission of one or more of the transmitted data frames in response to a situation in which a pre-determined time has elapsed after the transmission of the one or more data frames and no positive acknowledgement "ACK" identifying the most recently transmitted one of the one or more data frames has been received from the network element 112.

In a network element according to an exemplifying and non-limiting embodiment of the invention, the control system 104 is configured to set the acknowledgement information to comprise positive acknowledgements "ACK" each of which identifies one of the received data frames up to and including which the received data flow has been checked to be intact. The control system 104 is configured to initiate the transmission of the acknowledgement information to the network element 114. A positive acknowledgement "ACK" can be transmitted to the network element 114 each time when a predetermined time has elapsed from a reception of any data frame that has not yet been acknowledged and needs to be acknowledged. The rate at which the ACKs are transmitted can be determined by selecting the pre-determined time. In addition, the ACK can be transmitted after each time the received data flow that has been checked to be intact has been extended with a pre-determined number of received data frames. The pre-determined number can be e.g. one in which case the ACKs are transmitted more frequently than in a case where the pre-determined number is greater than one. Thus, in this case, the rate at which the ACKs are transmitted can be determined by selecting the pre-determined time and the pre-determined number.

In a network element according to an exemplifying and non-limiting embodiment of the invention, the control system 103 is configured to initiate retransmission of one or more of the transmitted data frames in response to a reception of a negative acknowledgement "NACK" that identifies the one or more of the transmitted data frames to be data frames that are missing from the data flow received at the network element 112.

In a network element according to an exemplifying and non-limiting embodiment of the invention, the control system 104 is configured to set the acknowledgement information to comprise negative acknowledgements "NACK" each of which identifies one or more data frames that are, on the basis of the order indicators of the received data frames, missing from the received data flow. The control system 104 is configured to initiate the transmission of the negative acknowledgements "NACK" to the network element 114. A NACK is typically transmitted and a received data frame is discarded when one or more other data frames that are preceding in the pre-determined mutual order of the data frames are missing from the received data frames. It is, however, also possible to store the received data frame for a while to see whether the one or more missing data frames arrive. This approach is suitable if the value of the order indicator of the received data frame is not unreasonably far from the value of the order indicator of the one or more missing data frames.

In a network element according to an exemplifying and non-limiting embodiment of the invention, the control system 103 is configured to initiate retransmission of one or more of the transmitted data frames and to deem another one or more of the transmitted data frames to be successfully received in response to a reception of a selective acknowledgement "SACK" that identifies the first mentioned one or more of the transmitted data frames to be data frames that are missing from the data flow received at the network element 112 and the other one or more of the transmitted data frames to be data frames that have been successfully received at the network element 112.

In a network element according to an exemplifying and non-limiting embodiment of the invention, the control system 104 is configured to set the acknowledgement information to comprise selective acknowledgements "SACK" each of which identifies one or more of the received data frames and one or more other data frames that are, on the basis of the order indicators of the received data frames, missing from the received data flow. The control system 104 is configured to initiate the transmission of the selective acknowledgements "SACK" to the network element 114.

The control system 104 is advantageously configured to maintain status data that is based on the order indicator of a particular one of the received data frames that is latest in the pre-determined mutual order amongst those of the received data frames up to and including which the received data flow has been checked to be intact. The status data can be for example the order indicator, e.g. a sequence number, of the above-mentioned one of the received data frames. It is also possible that the status data is the order indicator of a non-received data frame that is next in the pre-determined mutual order e.g. the sequence number of the received data frame incremented by one. The status data enables the control system 104 to check the integrity of the received data flow when a data frame belonging to the data flow under consideration is received next time. The control system 104 can be configured to invalidate the status data in response to a situation in which a pre-determined time has elapsed after the most recent reception of a data frame belonging to the data flow under consideration. The pre-determined time is advantageously selected so that, prior to invalidating the status data, the control system 104 can be sufficiently sure that the data transfer network does not contain any data frames travelling towards the network element 100 and belonging to the data flow under consideration. Thus, status data which is clearly irrelevant is aged out. The above-mentioned pre-determined time can for example a multiple of a retransmission interval. In this context, the retransmission interval means a temporal length of a time interval from a transmission of an unsuccessfully transferred data frame to a retransmission of this data frame.

The processing section 115 can be implemented with one or more processor circuits, each of which can be a programmable processor circuit provided with appropriate software, a dedicated hardware processor such as, for example, an application specific integrated circuit "ASIC", or a configurable hardware processor such as, for example, a field programmable gate array "FPGA". The memory section 106 can be implemented with one or more memory circuits each of which can be a random access memory "RAM".

Figure 2:
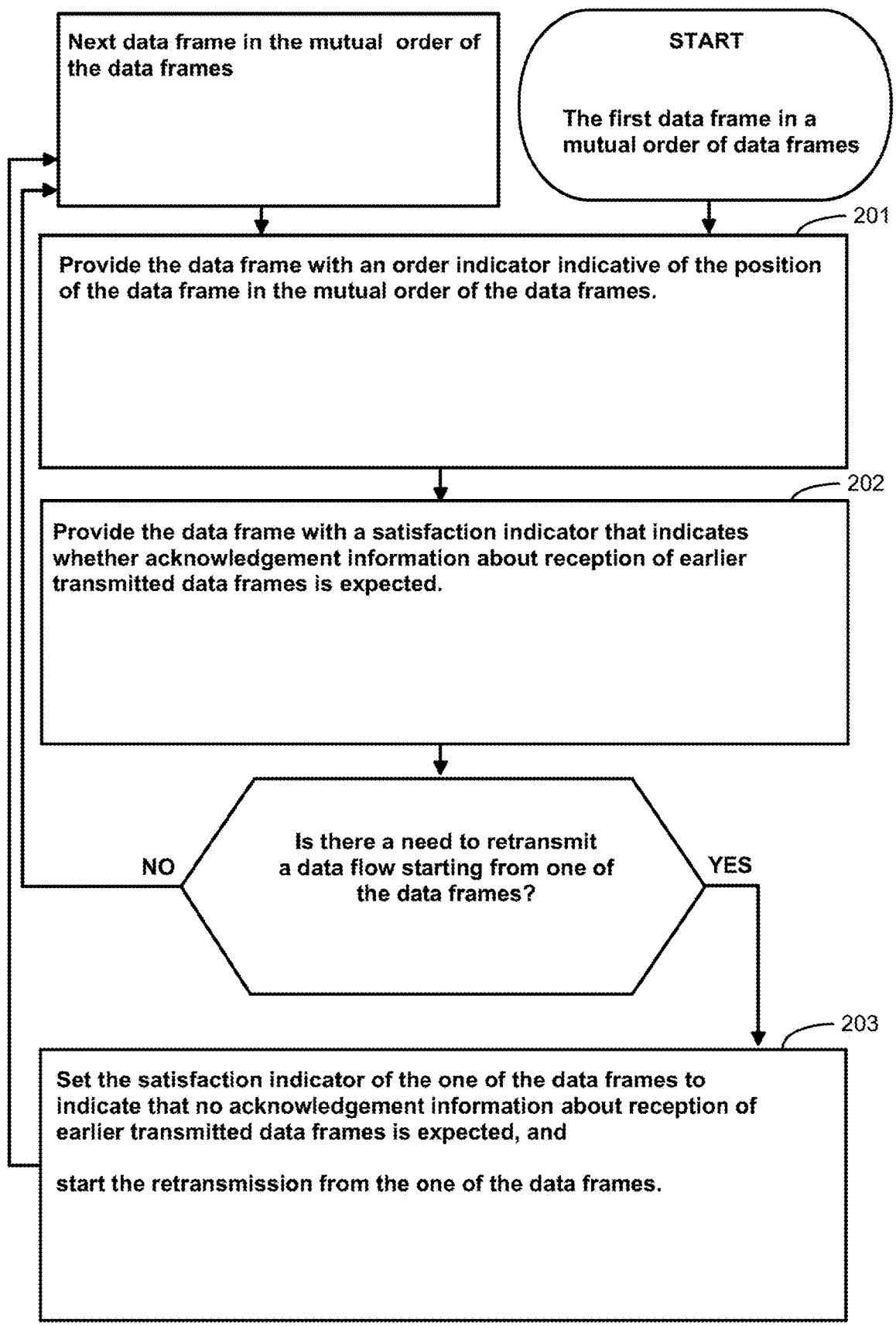
FIG. 2 shows a flowchart of a method according to an exemplifying and non-limiting embodiment of the invention for managing transmission of data frames.

FIG. 2 shows a flowchart of a method according to an exemplifying and non-limiting embodiment of the invention for managing transmission of data frames that have a pre-determined mutual order. The method comprises the following actions:

action 201: providing, each of the data frames, with an order indicator indicative of the position of the data frame under consideration in the pre-determined mutual order of the data frames, action 202: providing, each of the data frames, with a satisfaction indicator indicating whether acknowledgement information about reception of one or more of those of the data frames transmitted earlier than the data frame under consideration is expected from an entity for receiving the data frames, and action 203: setting, in response to a need to retransmit a data flow starting from one of the data frames, the satisfaction indicator of the one of the data frames to indicate that no acknowledgement information about reception of any data frame transmitted earlier than the one of the data frames is expected from the entity for receiving the data frames.

A method according to an exemplifying and non-limiting embodiment of the invention comprises initiating retransmission of one or more of the data frames in response to a situation in which a pre-determined time has elapsed after transmitting the one or more of the data frames and no acknowledgement information indicative of successful reception of the one or more of the data frames has been received from the entity for receiving the data frames.

A method according to an exemplifying and non-limiting embodiment of the invention comprises initiating retransmission of one or more of the data frames in response to a reception of the acknowledgement information identifying the one or more of the data frames to be data frames that are missing from a data flow received at the entity for receiving the data frames.

A method according to an exemplifying and non-limiting embodiment of the invention comprises initiating retransmission of one or more of the data frames and deeming another one or more of the data frames to be successfully received in response to a reception of the acknowledgement information identifying the first mentioned one or more of the data frames to be data frames that are missing from the data flow received at the entity for receiving the data frames and the other one or more of the data frames to be data frames successfully received at the entity for receiving the data frames.

A method according to an exemplifying and non-limiting embodiment of the invention comprises providing, each of the data frames, with a sender indicator identifying an entity for transmitting the data frames. The sender indicator may comprise for example an Internet Protocol "IP" address, a port number, and/or a Transparent Inter-process Communication "TIPC" port name.

In a method according to an exemplifying and non-limiting embodiment of the invention, the order indicator of each of the data frames is a sequence number indicative of the position of the data frame in the pre-determined mutual order of the data frames.

Figure 3:
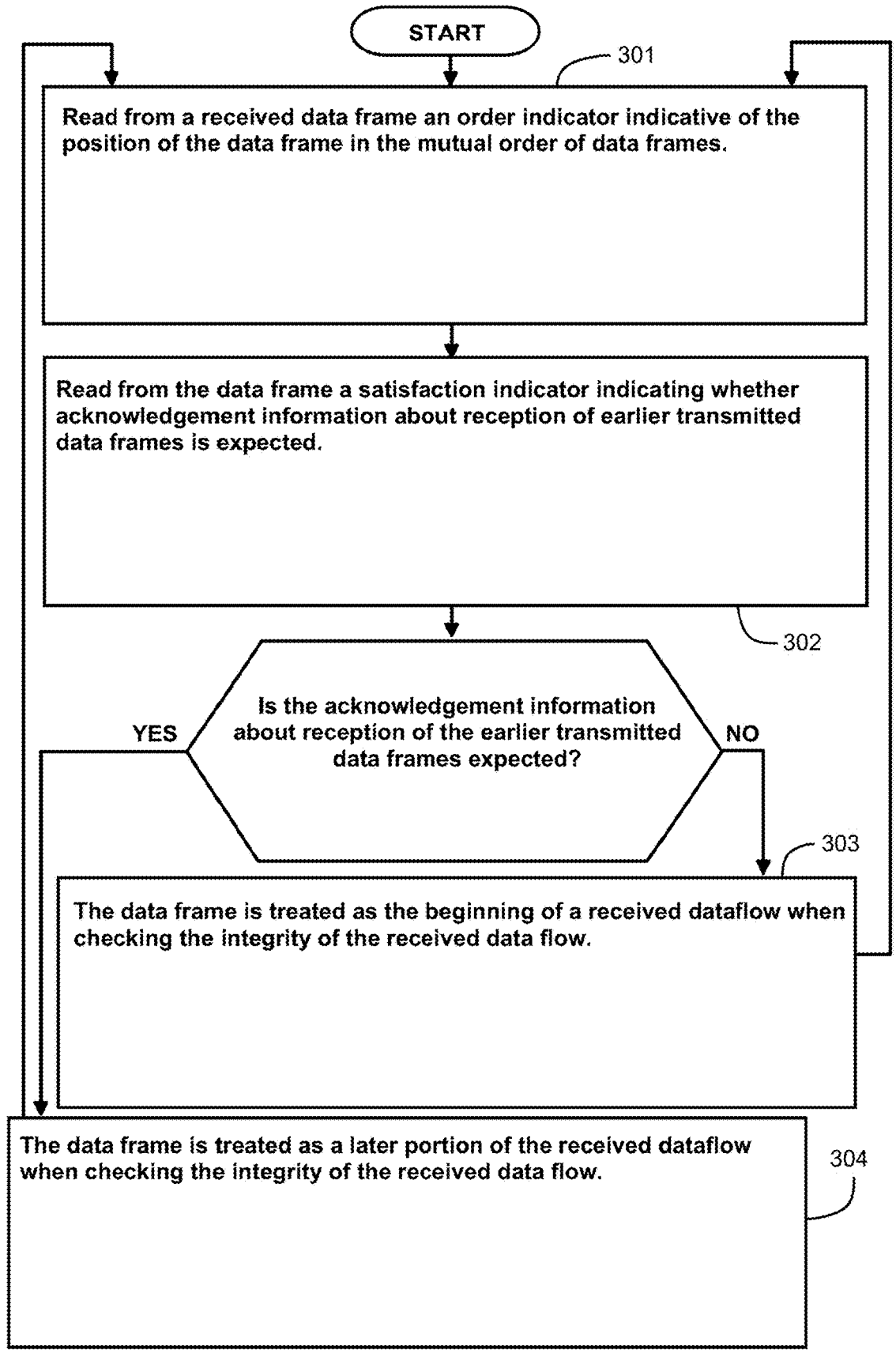
FIG. 3 shows a flowchart of a method according to an exemplifying and non-limiting embodiment of the invention for managing reception of data frames.

FIG. 3 shows a flowchart of a method according to an exemplifying and non-limiting embodiment of the invention for managing reception of data frames that have a pre-determined mutual order. The method comprises the following actions:

action 301: reading, from each of the data frames that have been received, an order indicator indicative of the position of the received data frame in the pre-determined mutual order of the data frames, action 302: reading, from each of the received data frames, a satisfaction indicator which indicates whether an entity for transmitting the data frames expects acknowledgement information about reception of one or more of those of the data frames transmitted earlier than the received data frame under consideration, and action 303: treating, in response to a situation in which the satisfaction indicator of one of the received data frames indicates that no acknowledgement information is expected, the one of the received data frames as a beginning of a received data flow when checking the integrity of the received data flow on the basis of the order indicators, and otherwise action 304: treating the one of the received data frames as a later portion of the received data flow when checking the integrity of the received data flow on the basis of the order indicators.

A method according to an exemplifying and non-limiting embodiment of the invention comprises setting the acknowledgement information to identify the most recently received one of the data frames up to and including which the received data flow has been checked to be intact. The method further comprises initiating the transmission of the acknowledgement information to the entity for transmitting the data frames.

A method according to an exemplifying and non-limiting embodiment of the invention comprises setting the acknowledgement information to identify one or more of the data frames that are, on the basis of the order indicators of the received data frames, missing from the received data flow. The method further comprises initiating the transmission of the acknowledgement information to the entity for transmitting the data frames.

A method according to an exemplifying and non-limiting embodiment of the invention comprises setting the acknowledgement information to identify one or more of the data frames that have been received and to identify other one or more of the data frames that are, on the basis of the order indicators of the received data frames, missing from the received data flow. The method further comprises initiating the transmission of the acknowledgement information to the entity for transmitting the data frames.

A method according to an exemplifying and non-limiting embodiment of the invention comprises maintaining status data based on the order indicator of a particular one of the received data frames which is latest in the pre-determined mutual order amongst ones of the received data frames up to and including which the received data flow has been checked to be intact. The status data maintains the ability to check the integrity of the received data flow.

A method according to an exemplifying and non-limiting embodiment of the invention comprises invalidating the status data in response to a situation in which a pre-determined time has elapsed after the most recent reception of one of the data frames.

A method according to an exemplifying and non-limiting embodiment of the invention comprises reading, from each of the received data frames, a sender indicator identifying the entity for transmitting the data frames, and managing the reception of the data frames separately from other data frames having a different sender indicator.

A computer program according to an exemplifying and non-limiting embodiment of the invention comprises computer executable instructions for controlling a programmable processing system to carry out actions related to a method according to any of the above-described exemplifying embodiments of the invention.

A computer program according to an exemplifying and non-limiting embodiment of the invention comprises software modules for managing transmission of data frames that have a pre-determined mutual order. The software modules comprise computer executable instructions for controlling a programmable processing system to:
  provide, each of the data frames, with an order indicator indicative of the position of the data frame under consideration in the pre-determined mutual order of the data frames,
  provide, each of the data frames, with a satisfaction indicator indicating whether acknowledgement information about reception of one or more of those of the data frames transmitted earlier than the data frame under consideration is expected from an entity for receiving the data frames, and
  set, in response to a need to retransmit a data flow starting from one of the data frames, the satisfaction indicator of the one of the data frames to indicate that no acknowledgement information about reception of any data frame transmitted earlier than the one of the data frames is expected from the entity for receiving the data frames.

A computer program according to another exemplifying and non-limiting embodiment of the invention comprises software modules for managing reception of data frames that have a pre-determined mutual order. The software modules comprise computer executable instructions for controlling a programmable processing system to:
  read, from each of the data frames that have been received, an order indicator indicative of the position of the received data frame in the pre-determined mutual order of the data frames,
  read, from each of the received data frames, a satisfaction indicator which indicates whether an entity for transmitting the data frames expects acknowledgement information about reception of one or more of those of the data frames transmitted earlier than the received data frame under consideration, and
  treat, in response to a situation in which the satisfaction indicator of one of the received data frames indicates that no acknowledgement information is expected, the one of the received data frames as a beginning of a received data flow when checking the integrity of the received data flow on the basis of the order indicators, and otherwise treat the one of the received data frames as a later portion of the received data flow when checking the integrity of the received data flow on the basis of the order indicators.

The above-mentioned software modules can be e.g. subroutines or functions implemented with a suitable programming language and with a compiler suitable for the programming language and the programmable processing system under consideration. It is worth noting that also a source code corresponding to a suitable programming language represents the computer executable software modules because the source code contains the information needed for controlling the programmable processing system to carry out the above-presented actions and compiling changes only the format of the information. Furthermore, it is also possible that the programmable processing system is provided with an interpreter so that a source code implemented with a suitable programming language does not need to be compiled prior to running.

A computer program product according to an exemplifying and non-limiting embodiment of the invention comprises a computer readable medium, e.g. a compact disc "CD", encoded with one or more computer programs each being according to an exemplifying embodiment of invention.

A signal according to an exemplifying and non-limiting embodiment of the invention is encoded to carry information defining one or more computer programs each being according to an exemplifying embodiment of invention.

The specific examples provided in the description given above should not be construed as limiting the scope and/or the applicability of the appended claims. Lists and groups of examples provided in the description given above are not exhaustive unless otherwise explicitly stated.

What is claimed is:

1. A first device for managing transmission of data frames having a pre-determined mutual order, the first device comprising a control system comprising one or more processor circuits configured to:
  provide, each of the data frames, with an order indicator indicative of a position of the data frame under consideration in the pre-determined mutual order of the data frames,
  provide, each of the data frames, with a satisfaction indicator indicating whether acknowledgement information about reception of one or more data frames transmitted earlier than the data frame under consideration is expected from an entity for receiving the data frames, and
  set, in relation to retransmission of a first data flow starting from one of the data frames, the satisfaction indicator of the one of the data frames to indicate that no acknowledgement information about reception of any data frame transmitted earlier than the one of the data frames is expected from the entity for receiving the data frames, wherein the set satisfaction indicator is adapted to provide a basis for the entity for receiving the data frames to, once the one of the data frames is received with the set satisfaction indicator, deem the one of the data frames as a beginning of a data flow in checking the integrity of the data flow on the basis of the order indicators.

2. The first device according to claim 1, wherein the one or more processor circuits of the control system is/are configured to initiate retransmission of one or more of the data frames in response to a situation in which a predetermined time has elapsed after transmitting the one or more of the data frames and no acknowledgement information indicative of successful reception of the one or more of the data frames has been received from the entity for receiving the data frames.

3. The first device according to claim 1, wherein the one or more processor circuits of the control system is/are configured to initiate retransmission of one or more of the data frames in response to a reception of the acknowledgement information identifying the one or more of the data frames to be data frames that are missing from a second data flow received at the entity for receiving the data frames.

4. The first device according to claim 1, wherein the one or more processor circuits of the control system is/are configured to initiate retransmission of one or more of the data frames previously transmitted under management by the first device, in response to a reception of acknowledgement information identifying the one or more of the data frames to be data frames that are missing from a second data flow that is transmitted under management by the first device and received at the entity for receiving the data frames, and to deem another one or more of the data frames previously transmitted under management by the first device to be successfully received in response to a reception of acknowledgement information identifying the another one or more of the data frames to be data frames successfully received at the entity for receiving the data frames.

5. The first device according to claim 1, wherein the one or more processor circuits of the control system is/are configured to provide, each of the data frames, with a sender indicator identifying an entity for transmitting the data frames.

6. The first device according to claim 5, wherein the sender indicator comprises at least one of the following: an Internet Protocol address, a port number, a Transparent Inter-process Communication port name.

7. The first device according to claim 1, wherein the order indicator of each of the data frames is a sequence number indicative of the position the data frame in the pre-determined mutual order of the data frames.

8. A second device for managing reception of data frames having a pre-determined mutual order, the second device comprising a control system comprising one or more processor circuits configured to:
   read, from each of received data frames, an order indicator indicative of a position of the received data frame under consideration in the pre-determined mutual order of the data frames,
   read, from each of the received data frames, a satisfaction indicator which indicates whether an entity for transmitting the data frames expects acknowledgement information about reception of one or more data frames transmitted earlier than the received data frame under consideration, and
   check, in response to a situation in which the satisfaction indicator of one of the received data frames indicates that no acknowledgement information is expected, the integrity of the received data flow on the basis of the order indicators deeming the one of the received data frames as a beginning of a received data flow, and otherwise instead check the integrity of the received data flow on the basis of the order indicators deeming the one of the received data frames as a later portion of a received data flow.

9. The second device according to claim 8, wherein the one or more processor circuits of the control system is/are configured to set the acknowledgement information to identify a most recently received one of the data frames up to and including which the received data flow has been checked to be intact, and to initiate transmission of the acknowledgement information to the entity for transmitting the data frames.

10. The second device according to claim 8, wherein the one or more processor circuits of the control system is/are configured to set the acknowledgement information to identify one or more of the data frames that are, on the basis of the order indicators of the received data frames, missing from the received data flow, and to initiate transmission of the acknowledgement information to the entity for transmitting the data frames.

11. The second device according to claim 8, wherein the one or more processor circuits of the control system is/are configured to set the acknowledgement information to identify one or more of the data frames that have been received and to identify other one or more of the data frames that are, on the basis of the order indicators of the received data frames, missing from the received data flow, and to initiate transmission of the acknowledgement information to the entity for transmitting the data frames.

12. The second device according to claim 8, wherein the one or more processor circuits of the control system is/are configured to maintain status data based on the order indicator of a particular one of the received data frames which is latest in the pre-determined mutual order amongst ones of the received data frames up to and including which the received data flow has been checked to be intact so as to maintain an ability of the control system to check the integrity of the received data flow.

13. The second device according to claim 12, wherein the one or more processor circuits of the control system is/are configured to invalidate the status data in response to a situation in which a pre-determined time has elapsed after a most recent reception of one of the data frames.

14. The second device according to claim 8, wherein the one or more processor circuits of the control system is/are configured to read, from each of the received data frames, a sender indicator identifying the entity for transmitting the data frames, and manage the reception of the data frames separately from other data frames having a different sender indicator.

15. A network element for a data transfer network, the network element comprising:
   a data transfer interface adapted to connect the network element to the data transfer network, and
   a processing system adapted to control operation of the network element,
wherein the processing system is configured to constitute at least one of the following: i) a first device for managing transmission of first data frames having a pre-determined mutual order, ii) a second device for managing reception of second data frames having a pre-determined mutual order, wherein the first device comprises one or more processor circuits configured to:
   provide, each of the first data frames, with an order indicator indicative of a position of the data frame under consideration in the pre-determined mutual order of the first data frames,
   provide, each of the first data frames, with a satisfaction indicator indicating whether acknowledgement information about reception of one or more first data frames transmitted earlier than the data frame under consideration is expected from an entity for receiving the first data frames, and set, in relation to retransmission of a first data flow starting from one of the first data frames, the satisfaction indicator of the one of the first data frames to indicate that no acknowledgement information about reception of any data frame transmitted earlier than the one of the first data frames is expected from the entity for receiving the first data frames, wherein the set satisfaction indicator is adapted to provide a basis for the entity for receiving the first data frames to, once the one of the first data frames is received with the set satisfaction indicator, deem the one of the first data frames as a beginning of a data flow in checking the integrity of the data flow on the basis of the order indicators, and wherein the second device comprises one or more processor circuits configured to:

read, from each of received second data frames, an order indicator indicative of a position of the received data frame under consideration in the pre-determined mutual order of the second data frames, read, from each of the received second data frames, a satisfaction indicator which indicates whether an entity for transmitting the second data frames expects acknowledgement information about reception of one or more second data frames transmitted earlier than the received data frame under consideration, and check, in response to a situation in which the satisfaction indicator of one of the received second data frames indicates that no acknowledgement information is expected, the integrity of the received data flow on the basis of the order indicators deeming the one of the received second data frames as a beginning of a received data flow, and otherwise instead check the integrity of the received data flow on the basis of the order indicators deeming the one of the received second data frames as a later portion of a received data flow.

16. The network element according to claim 15, wherein the network element comprises at least one of the following: an Internet Protocol "IP" router, a MultiProtocol Label Switching "MPLS" switch, a packet optical switch, an Ethernet switch, an asynchronous transfer mode "ATM" switch, an OpenFlow switch, a software-defined networking "SDN" controlled network element, a virtualized network function running in a virtual machine.

17. A first method for managing transmission of data frames having a pre-determined mutual order, the first method comprising:

providing, each of the data frames, with an order indicator indicative of a position of the data frame under consideration in the pre-determined mutual order of the data frames, providing, each of the data frames, with a satisfaction indicator indicating whether acknowledgement information about reception of one or more data frames transmitted earlier than the data frame under consideration is expected from an entity for receiving the data frames, and setting, in relation to retransmission of a first data flow starting from one of the data frames, the satisfaction indicator of the one of the data frames to indicate that no acknowledgement information about reception of any data frame transmitted earlier than the one of the data frames is expected from the entity for receiving the data frames, wherein the set satisfaction indicator is adapted to provide a basis for the entity for receiving the data frames to, once the one of the data frames is received with the set satisfaction indicator, deem the one of the data frames as a beginning of a data flow in checking the integrity of the data flow on the basis of the order indicators.

18. A second method for managing reception of data frames having a pre-determined mutual order, the second method comprising:

reading, from each of received data frames, an order indicator indicative of a position of the received data frame under consideration in the pre-determined mutual order of the data frames, reading, from each of the received data frames, a satisfaction indicator which indicates whether an entity for transmitting the data frames expects acknowledgement information about reception of one or more data frames transmitted earlier than the received data frame under consideration, and checking, in response to a situation in which the satisfaction indicator of one of the received data frames indicates that no acknowledgement information is expected, the integrity of the received data flow on the basis of the order indicators deeming the one of the received data frames as a beginning of a received data flow, and otherwise instead checking the integrity of the received data flow on the basis of the order indicators deeming the one of the received data frames as a later portion of a received data flow.

19. The second method according to claim 18, wherein the second method comprises maintaining status data based on the order indicator of a particular one of the received data frames which is latest in the pre-determined mutual order amongst ones of the received data frames up to and including which the received data flow has been checked to be intact so as to maintain an ability to check the integrity of the received data flow.

20. The second method according to claim 18, wherein the second method comprises reading, from each of the received data frames, a sender indicator identifying the entity for transmitting the data frames, and managing the reception of the data frames separately from other data frames having a different sender indicator.

* * * * *